`US010609555B2`

(12) United States Patent
Villar

(10) Patent No.: US 10,609,555 B2
(45) Date of Patent: Mar. 31, 2020

(54) SYSTEM AND A COMPUTER-IMPLEMENTED METHOD FOR MULTI PATH COMMUNICATION WITH AN UNMANNED AERIAL VEHICLE DURING A MISSION

(71) Applicant: The Boeing Company, Chicago, IL (US)

(72) Inventor: Victor Perez Villar, Madrid (ES)

(73) Assignee: The Boeing Company, Chicago, IL (US)

( * ) Notice: Subject to any disclaimer, the term of this patent is extended or adjusted under 35 U.S.C. 154(b) by 153 days.

(21) Appl. No.: 15/425,280

(22) Filed: Feb. 6, 2017

(65) Prior Publication Data

US 2017/0303123 A1 Oct. 19, 2017

(30) Foreign Application Priority Data

Apr. 6, 2016 (EP) ..................... 16382148

(51) Int. Cl.
*H04L 29/06* (2006.01)
*H04W 12/06* (2009.01)
(Continued)

(52) U.S. Cl.
CPC .......... *H04W 12/06* (2013.01); *G05D 1/0022* (2013.01); *H04K 3/20* (2013.01);
(Continued)

(58) Field of Classification Search
CPC ... H04W 12/06; H04W 12/04; H04W 12/003; H04W 12/0609; H04W 28/0226; H04W 28/0273; H04W 28/0289; H04W 28/08; H04W 36/18; H04W 12/04031; H04W 12/001; H04L 67/18; H04L 9/0819;
(Continued)

(56) References Cited

U.S. PATENT DOCUMENTS 9,309,009 B1 4/2016 Poux et al.
9,613,536 B1 * 4/2017 Wolford ................. G08G 5/003
(Continued)

FOREIGN PATENT DOCUMENTS

CN 104994112 A 10/2015
WO 2016025044 A2 2/2016

OTHER PUBLICATIONS

Aguilar Sanchez et al. The CCSDS Space Data Link Security Protocol; The 2010 Military Communications Conference-Unclassified Program—Systems Perspectives Track; Oct. 31, 2010.
(Continued)

*Primary Examiner* — Meng Li
(74) *Attorney, Agent, or Firm* — Duft & Bornsen, PC

(57) ABSTRACT

A system and a method of multi path communication to improve communication between an unmanned air vehicle (UAV) and ground control during a mission is disclosed. A database previously stores a plurality of secure data links to be used on networks during the mission for communicating and are managed for simultaneously distributing data flow among data links according to coverage and UAV location preventing third parties may compromise security of a mission. The database may be updated during the mission if needed.

15 Claims, 5 Drawing Sheets

(51) Int. Cl.
- *H04L 29/08* (2006.01)
- *H04K 3/00* (2006.01)
- *H04W 12/04* (2009.01)
- *G05D 1/00* (2006.01)
- *H04L 9/08* (2006.01)
- *H04W 12/00* (2009.01)
- *B64C 39/02* (2006.01)

(52) U.S. Cl.
CPC ............... *H04K 3/226* (2013.01); *H04K 3/92* (2013.01); *H04L 9/0819* (2013.01); *H04L 63/08* (2013.01); *H04L 67/12* (2013.01); *H04L 67/18* (2013.01); *H04L 69/14* (2013.01); *H04W 12/04* (2013.01); *H04W 12/04031* (2019.01); *B64C 39/024* (2013.01); *B64C 2201/146* (2013.01); *H04K 2203/18* (2013.01); *H04K 2203/22* (2013.01); *H04L 9/0844* (2013.01); *H04L 63/0442* (2013.01); *H04W 12/001* (2019.01)

(58) Field of Classification Search
CPC ..... H04L 69/14; H04L 63/0442; H04L 63/08; H04L 67/12; H04L 9/0844; G05D 1/0022; B64C 2201/146; B64C 39/024; H04K 3/20; H04K 3/92; H04K 3/226; H04K 2203/18; H04K 2203/22
See application file for complete search history.

(56) References Cited

U.S. PATENT DOCUMENTS

| | | | | |
|---|---|---|---|---|
| 2003/0014368 A1* | 1/2003 | Leurig | ............... | G06Q 20/0425 705/64 |
| 2003/0130909 A1* | 7/2003 | Caci | ............... | G06Q 30/06 705/26.81 |
| 2004/0192336 A1* | 9/2004 | Walby | ............... | H04W 48/18 455/456.1 |
| 2007/0044146 A1* | 2/2007 | Murase | ............... | G06F 21/33 726/10 |
| 2008/0133935 A1* | 6/2008 | Elovici | ............... | G06F 21/6227 713/193 |
| 2011/0161242 A1* | 6/2011 | Chung | ............... | G06Q 30/00 705/347 |
| 2013/0117321 A1* | 5/2013 | Fischer | ............... | G06F 16/21 707/792 |
| 2014/0003335 A1* | 1/2014 | Roy | ............... | H04L 69/14 370/328 |
| 2014/0075506 A1 | 3/2014 | Davis et al. | | |
| 2016/0242180 A1* | 8/2016 | Richards | ............... | H04W 4/70 |
| 2016/0300495 A1* | 10/2016 | Kantor | ............... | G08G 5/0039 |
| 2017/0229023 A1* | 8/2017 | Connor | ............... | H04W 84/18 |
| 2017/0374550 A1* | 12/2017 | Auer | ............... | H04B 5/0025 |

OTHER PUBLICATIONS

European Office Action; Application No. 16382148.1; Ref p. 2016-80; dated Oct. 11, 2016.

European Search Report; Application 16382148.1 1855; dated Sep. 22, 2016.

Robert M N Chirwa et al. Performance Improvement of Transmission in Unmanned Aerial Systems Using Multipath TCP; 2014 IEEE International Symposium on Signal Processing and Information Technology; Dec. 15, 2014.

Yong Zeng et al. Wireless Communications with Unmanned Aerial Vehicles: Opportunities and Challenges; Cornell University Library; Feb. 11, 2016.

European Search Report; Application 17382110.9-1870; dated May 4, 2017.

* cited by examiner

SYSTEM AND A COMPUTER-IMPLEMENTED METHOD FOR MULTI PATH COMMUNICATION WITH AN UNMANNED AERIAL VEHICLE DURING A MISSION

CROSS REFERENCE TO RELATED APPLICATIONS

This application claims the benefit of EP Patent Application No. 16382148.1 entitled A System and a Computer-Implemented Method for Multipath Communication with an Unmanned Aerial Vehicle During a Mission, filed on Apr. 6, 2016 in the Spanish Patent Office, the disclosure of which is incorporated herein by reference in its entirety.

FIELD

The present disclosure is comprised in the field of aeronautical telecommunication involving Unmanned Aerial Vehicle (UAV). In particular, it relates to enhanced security communication mechanism between the ground station(s) and the UAV.

BACKGROUND

An Unmanned Aerial Vehicle (UAV) is an aircraft that flies without a human crew onboard. UAVs may be operated remotely by humans or may be capable of autonomous operation. Conventionally, UAVs are not provided with a secure communications management capability. However, communications between the ground-based control systems and the UAV are of extreme importance to achieve the mission goals. In this scenario, continuous network connectivity cannot be assured. In addition, communication may need to be established over heterogeneous networks handling one or more communication paths or data links.

During a mission, the UAV sends/receives data to/from the ground control using different data links with diverse radio frequencies, broad bands, and types of communications systems. The UAV also uses communications standards like TCP/IP. In this regard, the existence of multiple and diverse aerial platforms, multiple specific functional payloads and mission's types may cause vulnerability. Third parties may compromise communication between the UAV and the ground control and potentially gain control of the UAV by hacking the data link. Thus the Ground Control communication data link, in this case, the Command and Control messages (C2 messages) and also the data exchanged (uplinked or downlinked) can be a specific target of a cyber-attack. Generally, threats may be related to spoofing, hijacking and jamming (insertion of noise into the communication channel).

Current mitigation threat techniques require complex and expensive electronic countermeasures (ECM) systems onboard. There are techniques for countering spoofing based on discrimination signal using amplitude signal, time-of-arrival, consistency, polarization or difference on angle-of-arrival. They provide some degree of mitigation when the data link is unique. However as explained above, an UAV typically uses many data links. Furthermore a mission normally involves one or many events that may disrupt data links, and often requires a change among data links. Such diversity of data links during a mission is an important factor in reducing efficacy of countermeasures.

SUMMARY

The present disclosure refers to a computer-implemented method and system to be implemented on an unmanned aerial vehicle (UAV) capable of managing security and diversity of communication.

TCP/IP communication standard is currently restricted to a single path per connection. It is a particular aspect of the present disclosure that multi path TCP (MPTCP) is proposed to be used, adding a new feature for handling a secure communication. This MPTCP standard enables the communication between UAV and ground control using multiple paths by allowing the usage of multiple addresses per node under the same connection. Advantageously, on a network, MPTPC appears to be the same as TCP. It is also backward compatible and various aspects are improved including communication traffic routing, network addressing, and connection management.

MPTCP provides several benefits, it increases the throughput of a data transfer by simultaneously using multiple interfaces. Congestion control mechanisms may be suitable for communication with the UAV. They also facilitate and ease the use of Delay-/Disruption-Tolerant Networks (DTN) and the new related technologies based on TCP/IP. It can be integrated with the global Aeronautical Telecommunications Network (ATN).

One example of the present disclosure relates to an onboard system of multi path communication for an unmanned air vehicle (UAV) during a mission. The system includes a database, a communicating unit, and a managing unit. The database is configured to store a plurality of secure data links to be used on one or more networks during the mission. The communicating unit is configured to communicate on one or more networks using a plurality of secured data links, and the managing unit is configured for managing data links and simultaneously distributing data flow among data links according to coverage and UAV location.

One example of the present disclosure relates to a method of multi path communication for an unmanned air vehicle (UAV) during a mission. The method is implemented by a computer including a processor and memory containing computer executable instructions that when executed by the processor, causes the computer to access a database storing a plurality of secure data links to be used on one or more networks during the mission and communicate data flow on one or more networks using a plurality of secured data links. The processor also executes instructions to manage data links and simultaneously distribute data flow among data links according to coverage and UAV location.

These and other features, functions, and advantages that have been discussed can be achieved independently in various embodiments or may be combined in yet other embodiments.

BRIEF DESCRIPTION OF THE DRAWINGS

A series of drawings which aid in better understanding the disclosure and which are presented as non-limiting examples and are very briefly described below.

DETAILED DESCRIPTION

During a mission a UAV may combine the bandwidth of multiple network connections, or to roam across different networks while maintaining a session with the ground control. To this end, the UAV implements multi path TCP (MPTCP) to split TCP flows of data over multiple networks and to change among networks seamlessly without dropping the session.

MPTCP is defined in the request for comments RFC-6824 of the Internet Engineering Task Force Working Group. The MPTCP works with actual IPV4 network addressing system but is fully compatible with the uses of the future IPv6 standard internet addressing system.

The techniques presented here describe MPTCP communication for dealing with different networks and balancing data flows during the UAV mission in order to guarantee a high level of security.

Figure 1:
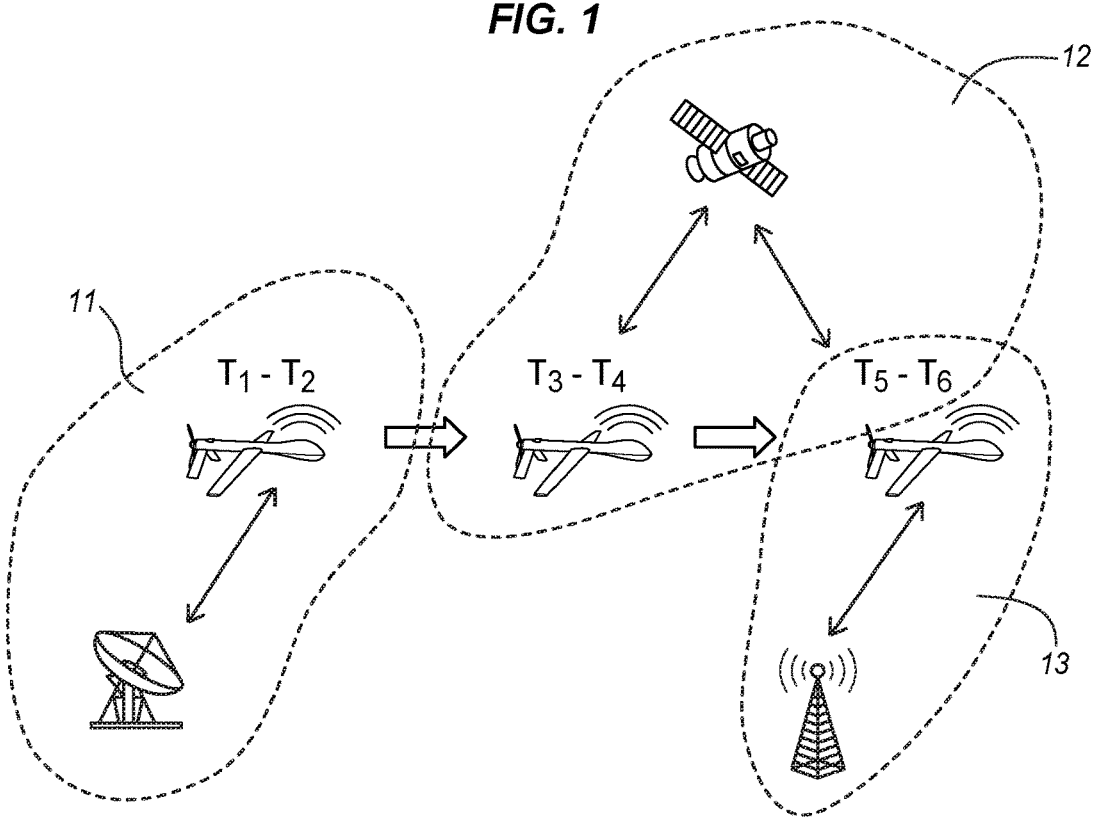
FIG. 1 schematically shows a UAV flying over geographical regions using different networks.
Figure 2:
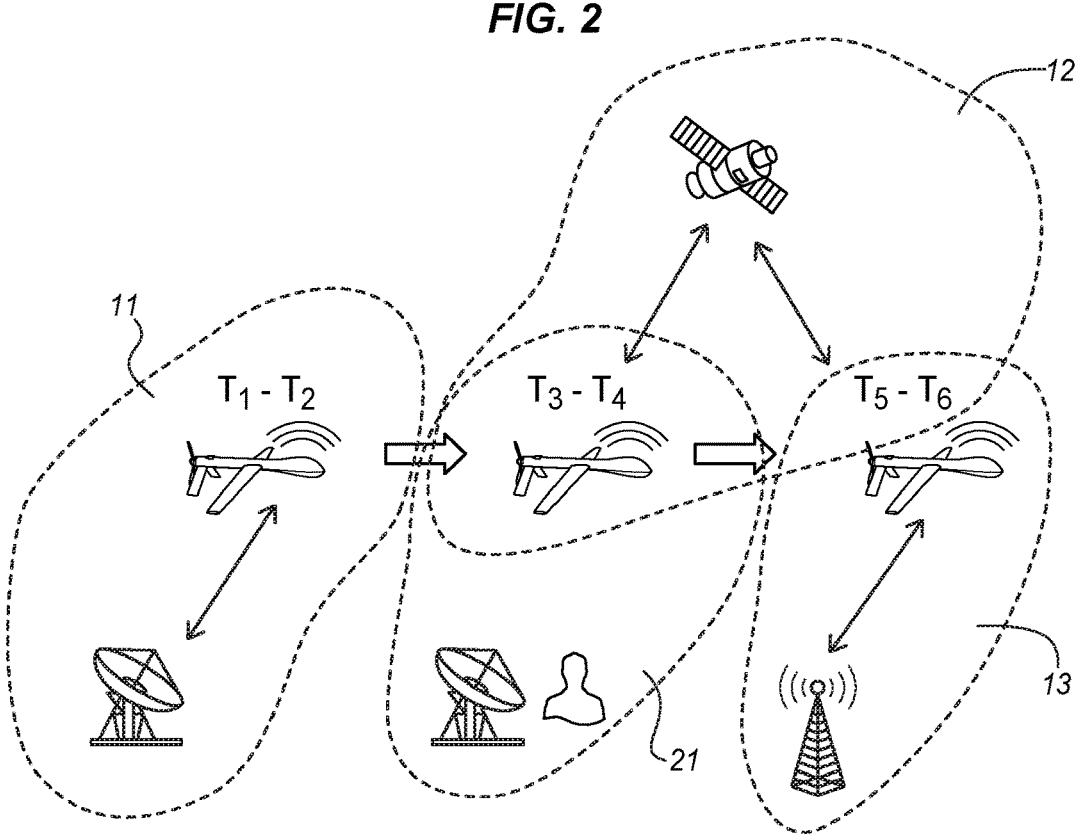
FIG. 2 schematically shows a third party trying to hack traffic of the UAV flying over geographical regions.

A usual situation is depicted in FIG. 1 and FIG. 2 where a UAV flies over the course of a mission across different regions (e.g. first and third regions 11 and 13 are terrestrial, second region 12 is satellite) and many data links may be available at the same time. A multi path communication would increase the broadband and also the reliability because various data links can be selected.

Favorably the Internet Protocol (IP) provides with network routing and addressing capabilities, which can be used to route around data link outages on multiple available data links. Internet also provides an end-to-end (UAV and ground control) data transport service, namely the Transmission Control Protocol (TCP) responsible for a reliable delivery even if some messages are lost.

As illustrated in FIG. 1, in the time interval from T1 to T6, the UAV communication is supported by different data links. The UAV activates and manages interfaces to deal with this data links and networks. In a TCP/IP scheme of communications the service is offered by a terrestrial antenna in a first region 11 during T1-T2; by satellite in second region 12 during T3-T4; and both simultaneously in third region 13 during T5-T6 (using MPTCP/IP protocol). In certain time intervals a specific data link may also be voluntarily disconnected, e.g. to maintain a discretional flight. Under this scenario the UAV may require handling several TCP/IP connections simultaneously, managing addresses and multiple available networks.

In order to manage several TCP connections, a UAV may organize a subdivision of data flow splitting among many network interfaces and data links, and also may include redundancy replicating the same data in different data links to assure communication with ground control. For example the UAV may only send vital data to terrestrial and satellite data link using a single TCP path, but using MPTCP the UAV is able to send 80% of data using a terrestrial data link and the rest, 20% of the data flow using the satellite at the same time.

MPTCP makes it possible to extend the concept of multipath communication as part of an overlay network in order to include the specific bundle protocol called Delay/Disruption-Tolerant Networking (DTN). An overlay network is a virtual network of communicating nodes and logical links that is built on top of an existing network with the purpose of implementing a service that is not available in the existing network. DTN as overlay network permits to manage disruptions and delays in communications, as well as multipath capability.

To maintain the MPTCP session, at least one data link is required. The communication is established using satellite communications, terrestrial communication networks, terrestrial Wi-Fi antennas, etc. By using a DTN and MPTCP in UAVs, a session is maintained even during long disconnection intervals and also extreme delays such as presently in some satellite communications. In certain cases this overlay network may deal with asymmetric broadband communications considering up links and down links.

The UAV needs to enable a seamless session end-point migration across a variety of network providers. In the middle of a communication a single TCP connection cannot handle changing end-point addresses (UAV IP address). A connection must be broken and re-established for each network address change. This is normally the case when the UAV is moving during a mission around both physically (across space), and logically (across networks) and needs to maintain the session with the authentication implemented at the data link layer.

Aside from diversity, mechanisms to ensure security of communication are needed during the mission. In this regard, FIG. 2 shows a similar situation as FIG. 1, in which a UAV flies during a mission across a region 21 where a third party tries to hack the communication between UAV and ground control.

Vulnerabilities by introducing MPTCP may result from the capacity of adding new addresses to an ongoing connection during UAV flight/mission, which can result in redirection of attacks. Before adding a new address to an ongoing communication the UAV must check the security/reliability of new address.

The mission is previously planned by a Mission Management System (MMS). During the preparation of a mission there is a specific task to design the communication plan with the ground control and with other trusted and cooperating UAV's. A communication plan includes definition of the data links expected to be used during the mission, the coverage and the trusted mechanisms to authenticate during the mission.

Figure 3:
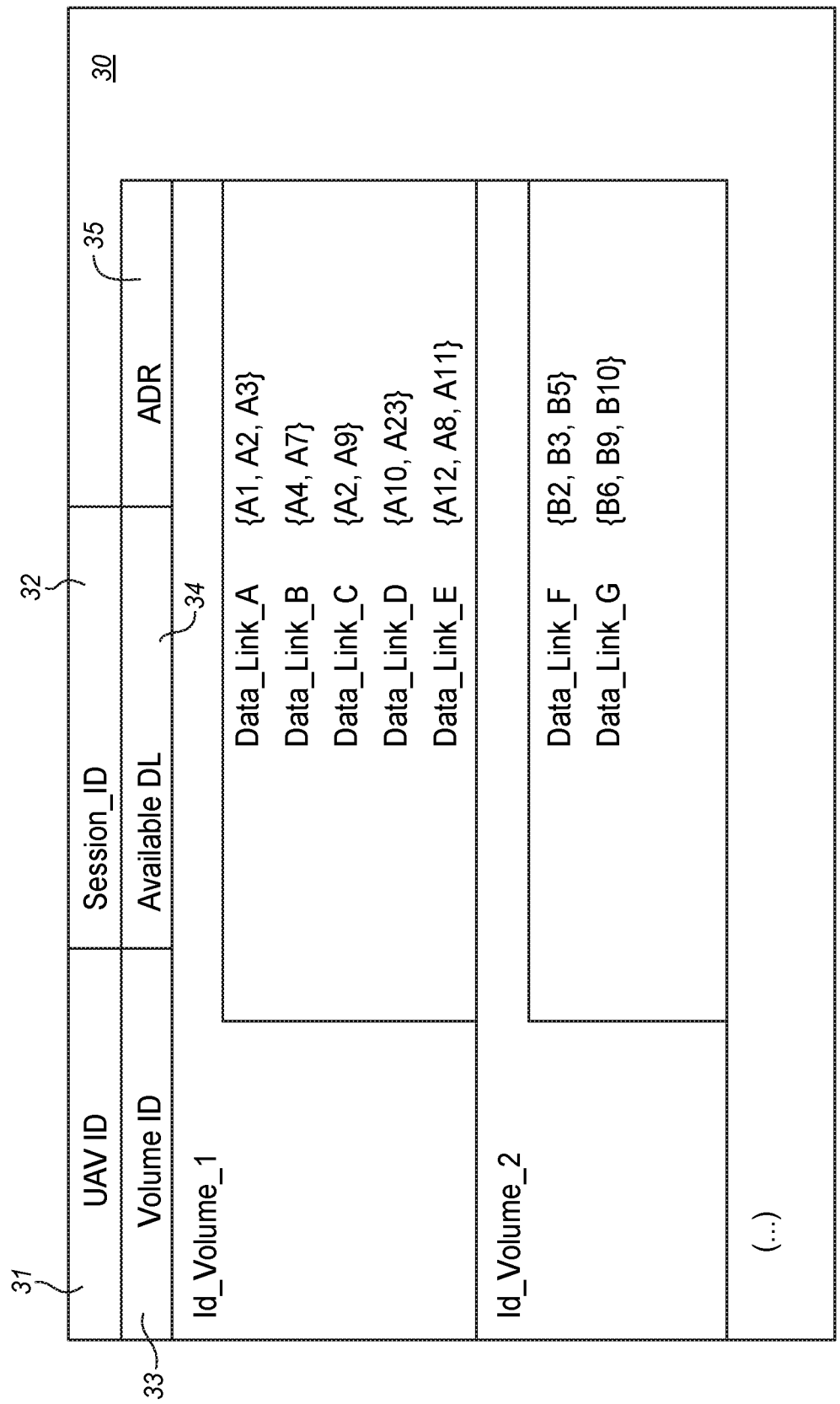
FIG. 3 describes an onboard database structure to manage security during a UAV flight/mission.

The data links are planned or updated based on availability. The data links may be collected and data link planning information may be maintained in a ground-based database, onboard database, or a combination of ground-based and onboard databases. Considering FIG. 3, an onboard database 30 is shown. The database 30 includes several fields 31-35 including the UAV identification (UAV ID 31) and the session identification (Session ID 32). These two values are unique identifiers and are assigned to the UAV at the beginning of planning when defining the mission objectives by the MMS.

In this disclosure the process of providing UAV ID 31 and Session ID 32 is called identification. The identification may use a hardware token composed by the physical unmanned platform and the functional payload mounted onboard. The identification may take place when the UAV is located on land inside ground control facilities, but it is also possible to be made by other trusted UAV in flight (machine-to-machine (M2M) identification).

The management of the database 30 can be initiated remotely by the ground control and/or trusted UAV's. Any update/delete/insert operation on elements of this database 30 must be performed by a UAV managing unit and transmitted using a secure data link to the ground control for being approved. The managing unit may be implemented as a computing device having a processor configured to execute computer readable program code stored on a device memory. Every operation on this database 30 is made after an authentication process. The authentication may be based on asymmetric key algorithms, using a previous step of key establishment (key exchange) between the UAV and the ground control. To authenticate the connection, any cryptographic protocol may be used like Diffie-Hellmann key exchange and public key infrastructure (PKI's). These actions prevent undesired manipulation of the database 30 from third parties.

Generally, a planned mission is constricted to a specific controlled air traffic area. This area can be defined as a space volume (for example, a 3D convex polygon) enclosed by its own vertices, vertices are referenced as geographical coordinates (latitude and longitude) and height. The overall volume is enclosed by a convex set of points called the convex hull (convex envelope). The convex hull is a concept used in computational geometry to define volumes by its own vertices.

Figure 6:
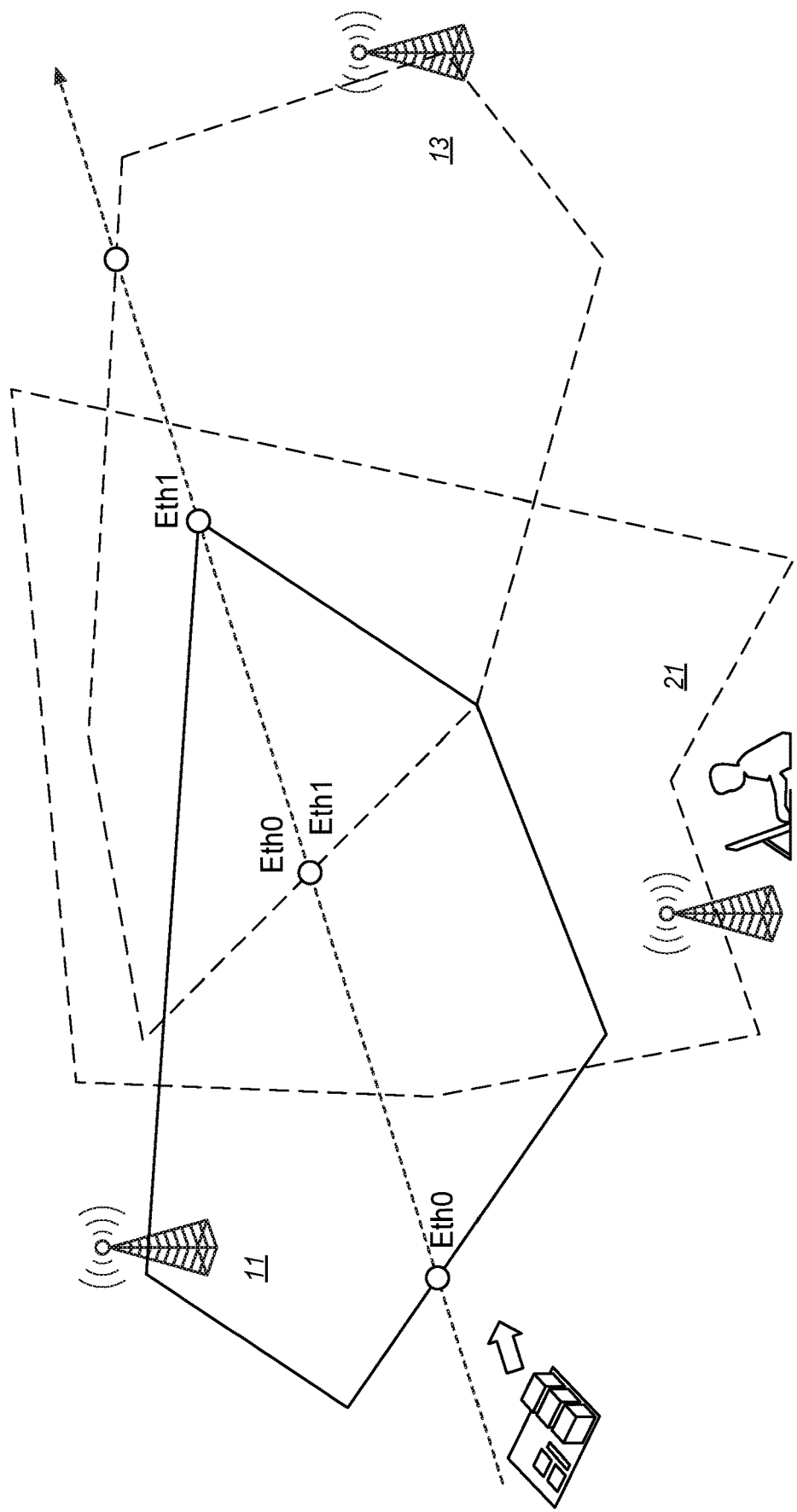
FIG. 6 schematically shows a decomposition of the UAV mission space into overlapping volumes.

As illustrated in FIG. 6 the overall space of UAV mission can be decomposed by overlapping convex volumes. Each volume has an identification and belongs to one (or many) data links coverage. A UAV may be in-flight in a single volume or may be in-flight in multiple overlapping volumes simultaneously. When the UAV is in-flight inside of one (or many) of these volumes, the UAV communicating unit only accepts communication with the previously identified volumes 33 and data links as approved and listed in its onboard database 30 (see table in FIG. 3). The UAV recognizes its geographical position at every moment, and may compute by using computational geometry what ID_VOLUME a given data link is associated with.

If the UAV finds a new data link inside a volume ID_VOLUME, the UAV may deny connection, or transmit its SSID (Service Set Identifier) plus a digital signature to ground control to wait for approval. If the ground control accepts the new data link, the onboard database 30 is properly updated.

Data for the onboard database 30 is loaded into the UAV after the authentication process, using a secure data link. The elements included in this database 30 must be considered trusted data links during the mission. The associated volumes must be geographically compatible with the mission path and also with the neighboring areas to be covered in case of contingency.

Figure 4:
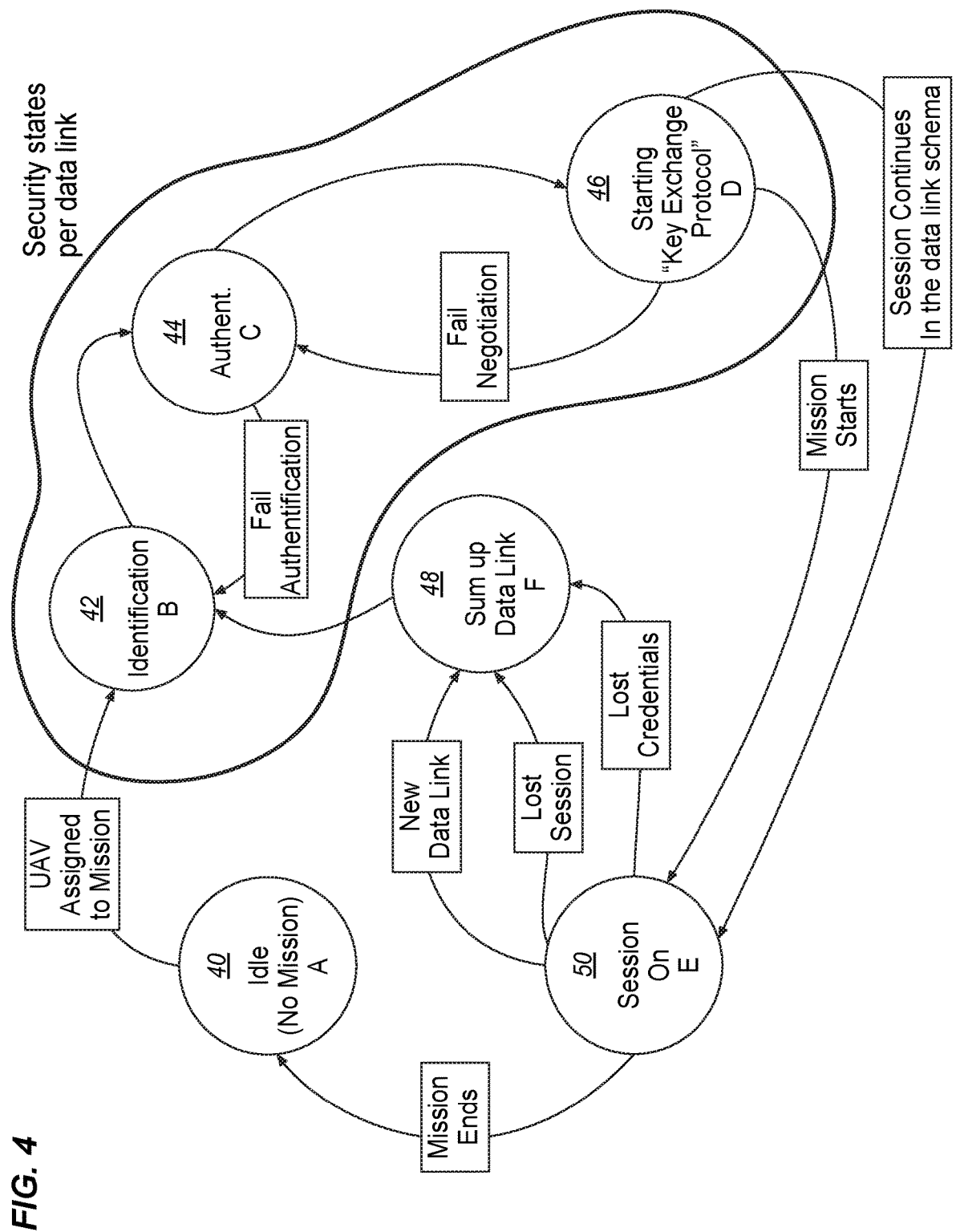
FIG. 4 shows a six states machine for securing communication.

The overall process to secure the multiple paths in a MPTCP communication between UAV and the ground control can be further explained with reference to the six state machine of FIG. 4.

A) Idle state 40—In this state the UAV has no mission assigned. It may be protected inside the owner facilities, together with other UAV's awaiting to be assigned to a mission. Alternatively, the UAV may be inflight waiting for a new assignment, or cooperating with other UAVs in another different mission, and a MMS. When the UAV is assigned to a mission, the state transitions to Identification 42 to verify the identification of the UAV.

B) Identification state 42—The identity of the UAV is confirmed and is defined as a digital identity of the UAV. The identification may use a hardware token associated with the UAV and/or its payload. The identification may also rely on a machine-to-machine (M2M) identification management scheme based on that digital identity. For example, identity of a UAV may be confirmed by another trusted UAV inflight. If an identification is successful, the state transitions to Authentication 44 to authenticate the identification of the UAV.

C) Authentication state 44—One or more various methods of authentication may be implemented in combination. It is possible to implement in this state a strong multi-factor authentication (MFA). Thus the identity of the UAV may be authenticated by successfully presenting several separate credentials like location by GPS, a security token, etc.

The initial authentication 44 is made before the UAV starts the mission with a secure Initial Key Exchange process (for example a popular Diffie-Hellman). This may be done using a protected LAN (Local Area Network) as part of the initial TCP/IP handshake. It is usually done inside the ground control facilities and/or by other trusted UAV during the flight.

After the authentication is completed successfully, the mission is considered to be assigned to the UAV and the mission may start autonomously. After the initial authentication state is completed, the database 30 with the data link coverage is loaded onboard.

When authentication is successful, communications using a data link transitions to Key Exchange 46 to establish secure communications.

D) Key Exchange state 46—Optionally, credentials may be exchanged to cypher the communication over each data link. For example, the Diffie-Hellman protocol is appropriate; there are two computers: one onboard and the other one located at ground control. A shared private key (encrypted) is generated which they can then exchange across an insecure data link. By doing so, obtaining the key by an eavesdropper can be avoided. When the key agreement (successful negotiation) is reached, the next state is to reach the session state 46.

E) Session state 50—This state creates a MPTCP session to maintain the ground systems connected with the UAV over the secure data link. All data are secured by strong encryption shared during the initial identification state 42. In case of the present disclosure, the information can be sent by a multi-path broadcast using MPTCP. This means: at first the communication has only one (the actual data link), if an additional data link is added to the group, the key may be shared also for this new data link. Only approved data links are used to communicate.

To maintain a set of valid data links inside of a multi-path scheme, it is proposed using a MPTCP feature to help connectivity between the UAV and ground. The UAV only uses the MPTCP data links marked as MP_CAPABLE (allow multi path sub flows). Any other data link offered by third parties, or existing occasionally nearby during the mission is avoided. Furthermore, to assure additional security of communication, every new data link may use its own key of encryption.

Using the MPTCP session the UAV can move across the space using a single IPv6 address (assigned at the beginning of the mission), or using a different IPv4 linked to different data links. Every change in IPv4 UAV address triggers the identification, authentication and key exchange. The overall process is compatible with the bundle layer defined in the DTN (Delay Tolerant Networks) and could even be possible to use this technique across the non TCP/IP networks. These two characteristics made this solution suitable for a myriad of approved data links while maintaining security.

During the communication session, new data links may be proposed, the onboard computer may lose the MPTCP session, or credentials may need to be reconfirmed. In these instances, the steps of Identification 42, Authentication 44, and Key Exchange 46 is required to re-establish a data link or approve a new data link, and the state would transition through the Sum Up state 48.

F) Sum Up state 48—This state is reached when a new data link is added to the possible ones, or when the onboard computer losses the MPTCP session (in this case shifts to the identification state 42). The Sum Up state 48 forces each new data link to be secure prior to being used under the MPTCP protocol.

SUMMARY OF PROCESS

In summary, the first task when the UAV starts a mission is the identification 42, authentication 44 and key exchange 46. These steps are usually implemented at the data link layer prior to start of the mission. The authentication 44 is linked to the session, and to the data link. If the MPTCP session is lost, some mechanisms are implemented to set up the previous authentication again. If a new data link is presented during the flight/mission, an approval from ground control is needed. The mechanism to obtain an approval is to re-transmit the new SSID together with credentials to the ground control and wait for approval. Ground control checks the database and determines whether or not the new data link is trusted.

The mission may start once the initial authentication is completed. The database 30 is loaded onboard (described in FIG. 3) storing a set of secure data links to be used during the flight/mission. These secure data links have associated a geographical volume already defined (convex hull), unique communication data link. Every data link has its own signature and also the digital signature to be validated and tunneled. These records are loaded into the database 30 at the beginning.

New Data Link

Figure 5:
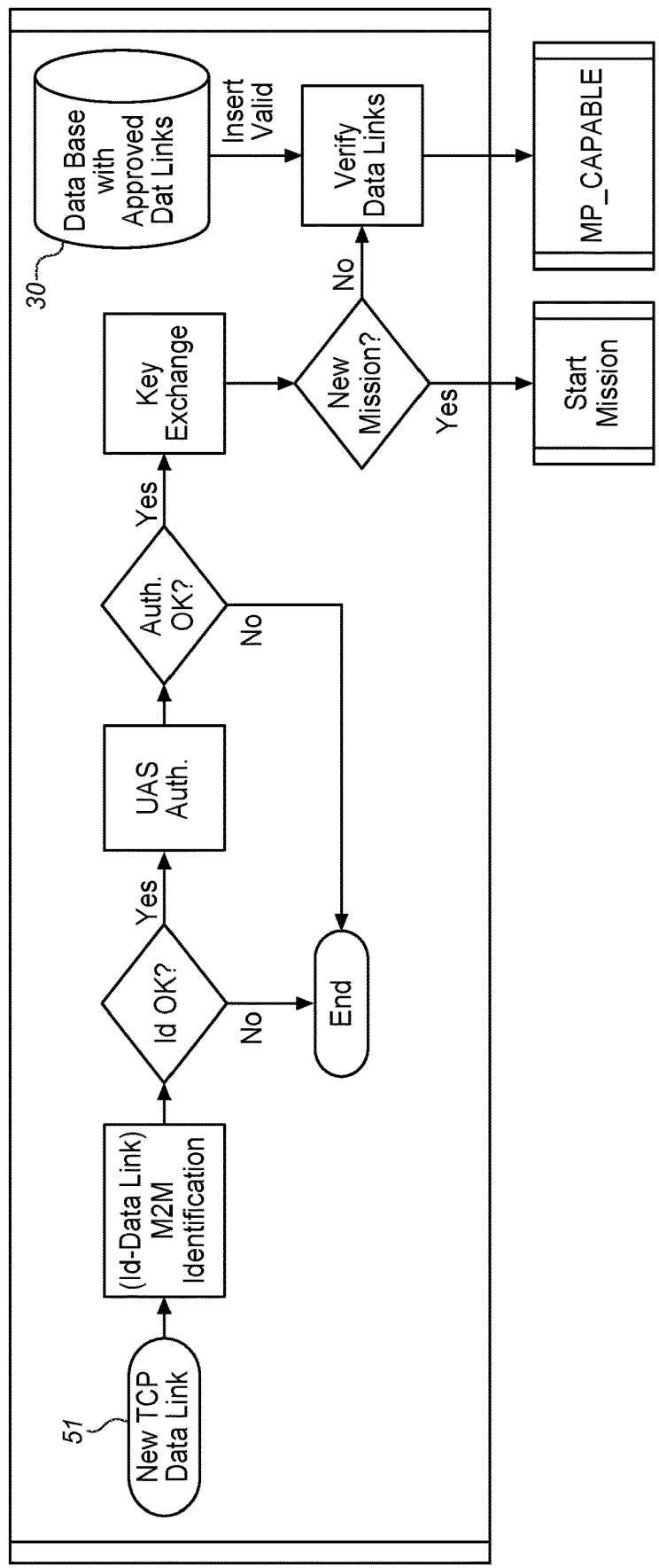
FIG. 5 depicts a validation of a new data link.

Any possible new data link must be approved by the ground control prior to being used by the UAV. The authentication of the new data links is one of the tasks of ground control. The UAV only needs to transmit the presence of new data links 51 to ground control. FIG. 5 shows a schematic example of validation of a new data link for a new mission or for a mission which is in progress.

A new data link 51, approved by ground control, can be added into the database 30 by the UAV communication unit and considered secure. The insertion must be communicated to the ground control and start using the new data link 51. Starting with an authentication, using the digital signature assigned to the network, allowing the communication assigned a multi path TCP sub flow to this data link. This insertion must be communicated to the ground control. The bidirectional communication with ground control during these operations must be encrypted on a secure data link avoiding to be interfered by third parties.

Sometimes ground control wants to delete or remove, a specific data link in the database 30 during the flight/mission. This operation must be communicated to the UAV only via an authenticated and trusted data link. Deletion must be confirmed using an alternative data link avoiding the man-in-the-middle attack.

The UAV stores and manages secure data links during the mission. The process of identification, authentication, and key exchange are made always for every new data link 51 as shown in FIG. 5. Therefore data links are encrypted with different keys, one per data link approved. Every new data link is handled in ground control. A receiver unit in the ground control is able to decrypt all the MPTCP packets and organize the data flow through the end-to-end system. In turn a strong cypher may be used to improve data links security.

If the UAV detects a new data link is available, the first step before being used, is checking whether is listed as a secure data links in the onboard database 30. Then the UAV may decide whether to use this new data link in a multipath manner if it is marked as MP_CAPABLE which may be stored as a register in the onboard database 30.

In accordance with one or more aspects of the present disclosure, an onboard system of multi path communication for an unmanned air vehicle (UAV) during a mission includes a database 30, a communicating unit, and a managing unit. The database 30 is configured to store a plurality of secure data links to be used on one or more networks during the mission. The communicating unit is configured to communicate on one or more networks using a plurality of secured data links, and the managing unit is for managing data links and simultaneously distributing data flow among data links according to coverage and UAV location.

In accordance with one or more aspects of the present disclosure, the database 30 includes geographical coverage data associated with each data link of a network.

In accordance with one or more aspects of the present disclosure, the managing unit is configured to select a data link in the database upon checking compatibility of current UAV location and geographical coverage data.

In accordance with one or more aspects of the present disclosure, the managing unit is configured to operate the database upon remotely receiving an instruction from an authenticated entity using a secure data link.

In accordance with one or more aspects of the present disclosure, a delete operation performed on an element of the database 30 is confirmed with the authenticated entity by the communicating unit using an alternative secure data link.

In accordance with one or more aspects of the present disclosure, each data link in the database is tagged with a separate encryption key.

In accordance with one or more aspects of the present disclosure, the communicating unit is configured to communicate using multi path TCP (MPTCP) and a plurality of data links in the database are marked as MP_CAPABLE.

In accordance with one or more aspects of the present disclosure, the authenticated entity is ground control or a different UAV.

In accordance with one or more aspects of the present disclosure, a computer-implemented method of multi path communication for an unmanned air vehicle (UAV) during a mission includes, accessing a database 30 and storing a plurality of secure data links to be used on one or more networks during the mission, communicating data flow on one or more networks using a plurality of secured data links, and managing data links and simultaneously distributing data flow among data links according to coverage and UAV location.

In accordance with one or more aspects of the present disclosure, the computer-implemented method includes an authentication step wherein the authentication is associated with the session and the data link.

In accordance with one or more aspects of the present disclosure, the authentication step is triggered when a data link is dropped or a new data link is used.

In accordance with one or more aspects of the present disclosure, the step of managing data links includes selecting a data link in the database upon checking compatibility of current UAV location and geographical coverage data.

In accordance with one or more aspects of the present disclosure, the step of managing data links further comprising operating the database upon remotely receiving an instruction from an authenticated entity using a secure data link.

In accordance with one or more aspects of the present disclosure, a computer program product for multi path communication for an unmanned air vehicle (UAV) during a mission includes computer code instructions that, when executed by a processor, causes the processor to perform the methods described herein.

The invention claimed is:

1. A system for multi path communication for an unmanned air vehicle (UAV) the system comprising:
   a database configured to store a plurality of secure data links to be used on one or more networks during a mission where the UAV flies across one or more regions; and
   the UAV, wherein:
   the UAV is configured to communicate on one or more networks using a plurality of secured data links that are established via a key exchange;
   the UAV is configured to dynamically determine availability of the secured data links during the mission; and
   the UAV is configured for simultaneously distributing data flow among the determined available secured data links according to a geographical coverage defined by the database for each of the secured data links and a location of the UAV.

2. The system of claim 1, wherein:
   the geographical coverage data for each secured data link defines an overall volume of coverage for the secured data link in the form of a convex hull.

3. The system of claim 2, wherein:
   the UAV is configured to select one of the secured data links in the database in response to determining that the secured data link is compatible with a current location of the UAV and geographical coverage data.

4. The system of claim 2, wherein:
   the UAV is configured to operate the database upon remotely receiving an instruction from an authenticated entity using a secured data link.

5. The system of claim 4, wherein:
   a delete operation performed on an element of the database is confirmed with the authenticated entity by the communicating unit using an alternative secured data link.

6. The system of claim 5, wherein:
   the authenticated entity is ground control or a different UAV.

7. The system of claim 1, wherein:
   each secured data link in the database is tagged with a separate encryption key.

8. The system of claim 1, wherein:
   the UAV is configured to communicate using multi path TCP (MPTCP) and a plurality of secured data links in the database are marked as MP_CAPABLE.

9. A computer-implemented method of multi path communication for an unmanned air vehicle (UAV), the method comprising:
   storing in a database a plurality of secure data links to be used on one or more networks during a mission where the UAV flies across one or more regions;
   communicating data flow on one or more networks using a plurality of secured data links that are established via a key exchange;
   dynamically determining availability of the secured data links during the mission; and
   simultaneously distributing data flow among the determined available secured data links according to a geographical coverage defined by the database for each of the secured data links and a location of the UAV.

10. The computer-implemented method of claim 9, wherein:
    the geographical coverage data for each secured data link defines an overall volume of coverage for the secured data link in the form of a convex hull.

11. The computer-implemented method of claim 10, further comprising:
    an authentication step wherein the authentication is associated with a session and a secured data link.

12. The computer-implemented method of claim 11, wherein:
    wherein the authentication step is triggered whenever one of the secured data links is dropped or a new data link is used.

13. The computer-implemented method of claim 9, wherein:
    dynamically determining availability of the secured data links during the mission comprises decomposing the mission into overlapping convex volumes.

14. The computer-implemented method of claim 9, wherein:
    the geographical coverage data for each secured data link is defined in the form of vertices that each include a latitude, longitude, and height.

15. A non-transitory computer readable medium for multi path communication for an unmanned air vehicle (UAV) during a mission, storing computer code instructions that, when executed by a processor, cause the processor to perform a method of multi path communication for the UAV during a mission where the UAV flies across one or more regions, the method comprising:
    storing in a database a plurality of secure data links to be used on one or more networks during the mission;
    communicating data flow on one or more networks using a plurality of secured data links that are established via a key exchange;
    dynamically determining availability of the secured data links during the mission; and
    simultaneously distributing data flow among the determined available secured data links according to a geographical coverage defined by the database for each of the secured data links and a location of the UAV.

* * * * *

UNITED STATES PATENT AND TRADEMARK OFFICE
CERTIFICATE OF CORRECTION

PATENT NO. : 10,609,555 B2
APPLICATION NO. : 15/425280
DATED : March 31, 2020
INVENTOR(S) : Villar Page 1 of 1

It is certified that error appears in the above-identified patent and that said Letters Patent is hereby corrected as shown below:

In the Claims

Column 10, Claim 12, Line 27, (approx.), Please remove the word "wherein".

Signed and Sealed this
Twenty-sixth Day of May, 2020

Andrei Iancu
*Director of the United States Patent and Trademark Office*